United States Patent [19]

Schlicker

[11] 4,182,500

[45] Jan. 8, 1980

[54] OPTICAL WAVEGUIDE SHIPPING SPOOL

[75] Inventor: Melvin C. Schlicker, Corning, N.Y.

[73] Assignee: Corning Glass Works, Corning, N.Y.

[21] Appl. No.: 926,498

[22] Filed: Jul. 20, 1978

[51] Int. Cl.² ............................................. B65H 75/14
[52] U.S. Cl. ................................................. 242/118.7
[58] Field of Search ............. 242/118.7, 118.32, 118.2, 242/118.11

[56] References Cited

U.S. PATENT DOCUMENTS

| 2,654,549 | 10/1953 | Rappleyea | 242/118.7 |
| 3,522,700 | 8/1970 | Fisher, Jr. | 242/118.2 |

FOREIGN PATENT DOCUMENTS 1429360  1/1966  France ................................ 242/118.2

Primary Examiner—George F. Mautz
Attorney, Agent, or Firm—William J. Simmons, Jr.; Walter S. Zebrowski

[57] ABSTRACT

Disclosed is a spool for shipping low expansion optical waveguide filament. The filament supporting portion of the spool is a composite structure consisting of a cylindrically-shaped barrel of material having a thermal coefficient of expansion no greater than $125 \times 10^{-7}/°C$ surrounded by a layer of resilient foam material. When a filament is wound on the spool with a predetermined tension, filament breakage and entanglement are eliminated even when the spool is subjected to temperature extremes.

3 Claims, 3 Drawing Figures

OPTICAL WAVEGUIDE SHIPPING SPOOL

BACKGROUND OF THE INVENTION

The present invention relates to a spool for shipping filaments of material having a low thermal coefficient of expansion (TCE), such as thin glass optical waveguide filaments.

The characteristics of a class of optical waveguide filaments and methods of making the same are disclosed in the publication "Doped-Deposited-Silica Fibers for Communications" by R. D. Maurer, Proc. IEEE, Vol. 123, No. 6, June, 1976, pp. 581–585. The tensile strength of such filaments is generally greater than 25,000 psi. However, since the diameters thereof are generally in the range of between 110–140 μm, they cannot be subjected to undue tensile force during handling and shipping.

The temperature variations to which such filaments have been subjected during shipping have caused filament breakage or entanglement as the encountered temperatures were higher or lower, respectively, than those encountered during the filament winding process. Since commonly employed high silica-content filaments have expansion coefficients in the range of $7-15 \times 10^{-7}/°C$., both of these modes of failure were due to the wide variance in thermal expansion rates between the filament and the spool, which was commonly made of polystyrene. This variance caused excessive stress to be transmitted to the filaments at high temperatures and complete loss of winding tension at low temperatures.

U.S. Pat. Application Ser. No. 903,001 entitled "Spool for Filament Winder" filed May 4, 1978 (R.T. Bonzo) teaches a filament winding spool comprising an expanded polystyrene barrel surrounded by a layer of foam rubber which is covered by a thin plastic layer. This spool has been satisfactorily employed in the manufacture of glass optical waveguide filament since temperature is controlled during the manufacturing operation. The foam rubber layer was employed to cushion the filament against roughness of the polystyrene barrel. Since the TCE of polystyrene is about $700 \times 10^{-7}/°C$., this winding spool cannot be used to ship such glass filament under conditions where temperature extremes are encountered.

It was initially thought that the aforementioned disadvantages could be remedied by forming the shipping spool from a material having a thermal coefficient of expansion approaching that of the filament material. If the filament were to be directly wound on the spool barrel, the maximum permissible TCE of the barrel material would be $30 \times 10^{-7}/°C$. Also, the surface of such a barrel should be free from roughness which could introduce microbends into the filament. No satisfactory material could be found.

SUMMARY OF THE INVENTION

It is therefore an object of the present invention to provide a spool on which low expansion glass optical waveguide filaments can be shipped and handled without experiencing breakage or entanglement even though temperature extremes are encountered.

Briefly, the spool of the present invention comprises a cylindrically shaped barrel formed of a material having a thermal coefficient of expansion no greater than $125 \times 10^{-7}/°C$. A layer of resilient foam material is disposed around the circumference of the barrel. A flange is disposed at each end of the barrel, the flanges extending radially beyond the surface of the foam layer.

DESCRIPTION OF THE PREFERRED EMBODIMENT

Figure 1:
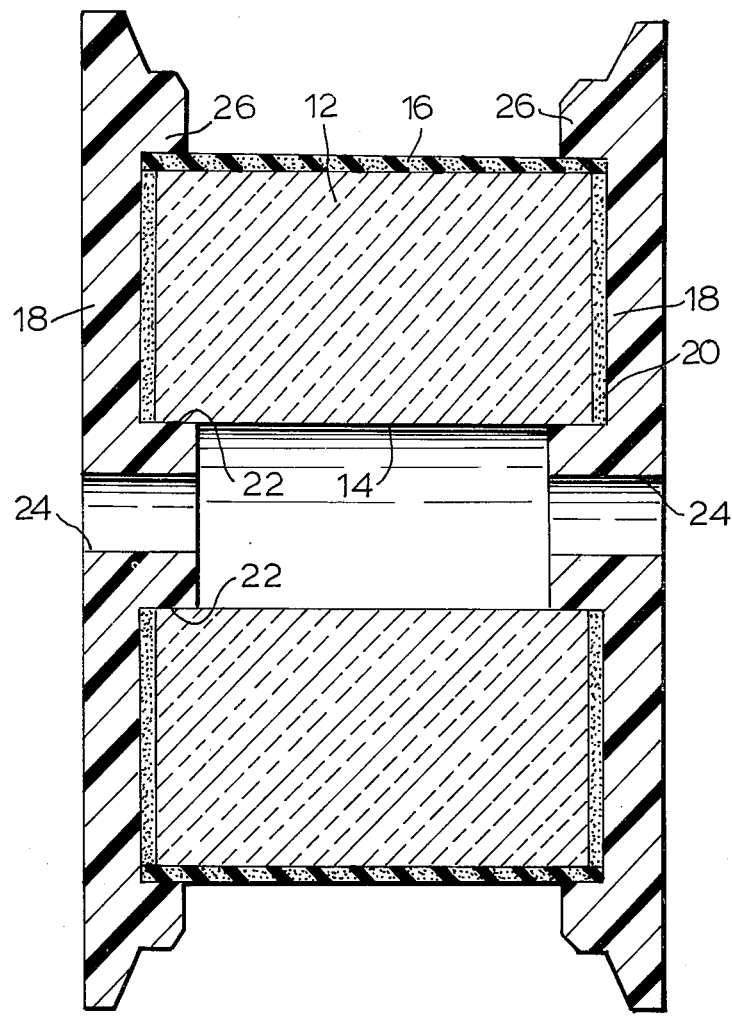
FIG. 1 shows a cross-sectional view of a spool constructed in accordance with the present invention.

It is to be noted that the drawing is illustrative and symbolic of the present invention, and there is no intention to indicate the scale or relative proportions of the elements shown therein. The present invention will be described in connection with the winding of optical waveguide filaments although this invention is not intended to be limited thereto.

Experimentation has revealed that relatively small differences in TCE, viz. Less than about $90 \times 10^{-7}/°C$., between the bulk of the filament-supporting structure and the filament can be tolerated if a layer of suitable buffer material is employed between the low expansion glass filament and the high expansion spool barrel. The resulting composite structure, which is shown in FIG. 1, comprises a cylindrically-shaped spool barrel 12 having an axial bore 14 therethrough. The circumference of the barrel is wrapped with a layer of resilient foam or cellular material 16, and the ends of the barrel are provided with flanges 18 which are secured thereto by bonding material 20. Flanges 18 preferably have annular grooves 22 to provide proper alignment of the barrel with respect thereto. Axially disposed apertures 24 in flanges 18 are adapted to receive a spindle for winding or unwinding purposes. The barrel and flanges may be a unitary construction provided that the material from which they are formed is sufficiently strong.

Barrel 12 must possess a TCE not greater than $125 \times 10^{-7}/°C$. and must not be susceptible to other forms of expansion, such as expansion due to chemicals, moisture or the like. Barrel 12 is preferably formed of a foamed cellular glass such as that disclosed in U.S. Pat. No. 2,890,127. A commonly available foam glass sold by Pittsburgh Corning Corporation has a TCE of about $80 \times 10^{-7}/°C$. This material is preferred since it is both light and inexpensive.

Figure 2:
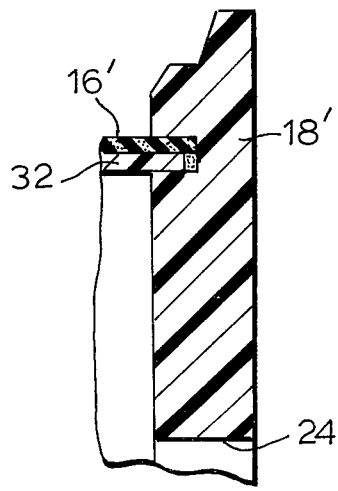
FIG. 2 is a partial cross-sectional view of another embodiment.

In the embodiment illustrated in FIG. 2, wherein elements similar to those of FIG. 1 are represented by primed reference numerals, barrel 32 consists of a filament wound cylinder which is commercially available in an embodiment having a TCE of about $90 \times 10^{-7}/°C$. Such cylinders, which provide adequate strength even when the thickness thereof is 3 mm or less, are formed by winding resin-coated continuous filaments of glass fiber strands about a revolving mandrel. After the resin is polymerized, hardened or cured to fix the shape of the cylinder, the mandrel is removed.

Figure 3:
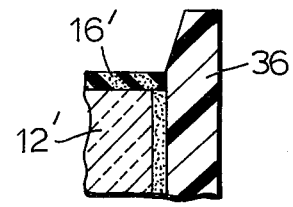
FIG. 3 is a partial cross-sectional view of a spool having a modified flange.

Flanges 18 may be formed of any material that is strong enough to take any impact to which the spool may be subjected. For usual handling, the flanges may be made from plastic, wood or the like, expanded polystyrene being preferred because it is light and inexpensive. The TCE of the flange material is not critical and can be relatively large if bonding material 20 is sufficiently elastic to absorb any shear force that would tend to arise as a result of expansion differences between the barrel and the flange. For example, expanded polystyrene flanges can be employed even though the TCE of expanded polystyrene is $700 \times 10^{-7}/°C$. when an elastic adhesive is employed as the bonding aterial. Flanges 18 may include lands 26 to assist in the retention of the edges of layer 16. As shown in FIG. 3, these lands may be omitted from flange 36 to provide a greater winding surface.

The resilient buffer layer 16 preferably consists of polyurethane foam. However, any suitable foam materials such as epoxies, phenolics, polypropylene, polyethylene and the like are useful. The density and thickness of this layer should be such that it functions as a resilient cushioning layer which absorbs expansion forces as the barrel expands and which mechanically expands and tends to return to its original profile to compensate for contraction of the barrel. The thickness of foam layer 16 should be in the range of about 0.13 to 1.3 cm. If this layer is too thin, its effect will be negligible. If it is too thick, handling the spool can cause entanglement of filament due to excessive deformation of the foam layer. The optimal combination comprises a barrel having a hard surface covered by the above-described foam layer.

In order to provide the proper amount of deflection, the ILDS of the foam layer should be between 35 and 70 pounds. The ILDS (Indentation Load Deflections) value is determined as follows. A rigid platform having an area of one square foot is placed on a two inch thick piece of the foam material, the area of which is such that it extends beyond the platform. Weight is added to the platform until a twenty five percent deflection of the foam occurs, the foam thickness then being 1.5 inch. The total weight required to achieve this specified amount of deflection, including the weight of the platform, is referred to as the ILDS value.

The spool disclosed herein can withstand temperature extremes encountered during shipping because of the complimentary action of the barrel and the resilient layer. Filament damage or breakage is eliminated by minimizing the stress transmitted to the filament from the spool barrel. As the barrel expands because of a temperature increase in its environment, it expands at a faster rate than the glass filament wound over it. The resultant stresses, if transmitted to the filament, could cause filament failure if they exceeded the tensile strength thereof. Because of the exceptionally small cross-sectional area of the filament, this failure threshold is easily achieved. Insertion of the buffer layer 16 between the filament and barrel substantially reduces this stress. The net result is that filament breakage due to expansion of the barrel material can be eliminated.

Entanglement is attributed to the spool shrinking away from the glass filament which is dimensionally stable through a large temperature range. This condition releases part or all of the winding tension, thereby allowing wraps of filament to move freely along the axis of the spool so that they become entangled with other wraps. As a result of this situation, the filament cannot be dereeled.

Forming the spool from a material of relatively low TCE reduces but does not eliminate the effects of contraction due to temperature decrease. The addition of buffer layer 16 functions in the following manner to maintain tension as the spool barrel contracts. In the spooling process the filament is wound at a specified tension. This tension compresses the buffer layer because the force of the load applied by the filament exceeds the load bearing capabilities of the buffer material. As the barrel contracts at lower temperatures, the winding tension is reduced. However, the buffer layer expands mechanically to retain a portion of the winding tension that would otherwise have been cancelled. Thus, the effect of spool barrel contraction can be compensated throughout a given temperature range, thereby eliminating filament entaglement.

In a specific embodiment constructed in accordance with the present invention barrel 12 consisted of a cylinder of foam glass having a TCE of $80 \times 10^{-7}/°C$. The barrel had an outside diameter of about 14.6 cm, and inside diameter of about 3.8 cm and a length of about 10 cm. Layer 16 consisted of a 3 mm thick layer of urethane foam. Polystyrene flanges 18 were bonded to the ends of barrel 12 by an elastic adhesive commercially available as 3 M hot melt 3738. A high silica-content optical waveguide filament having an outside diameter of 125 $\mu m$ was initially wound on a draw reel in accordance with the teachings of the U.S. Pat. application Ser. No. 902,977 (R. T. Bonzo et al. ) filed May 4, 1978. The filament was then rewound on the above-described shipping reel at a winding tension of 25 grams at a 3° pitch. The filament was not deleteriously affected even though the spool was subjected to temperatures between $-55°$ C. and $+70°$ C.

I claim:

1. A spool for low expansion filament comprising a cylindrically shaped barrel formed of a first material having a thermal coefficient of expansion no greater than $125 \times 10^{-7}/°C$., a layer of resilient foam material disposed around the circumference of said barrel, a flange at each end of said barrel, said flanges extending radially beyond the surface of said layer, said flanges being formed of a material different than said first material, and having lands which extend over the edges of said layer, and a layer of resilient bonding material is disposed between the ends of said barrel and the corresponding surfaces of said flanges.

2. A spool for low expansion glass filament comprising a cylindrically shaped barrel formed of a material having a thermal coefficient of expansion no greater than $125 \times 10^{-7}/°C$., a layer of resilient foam material disposed around the circumference of said barrel, said foam material having an indentation load deflections value between 35 and 70 pounds, and the thickness of said layer is between 0.13 and 1.3 cm, and a flange at each end of said barrel, said flanges extending radially beyond the surface of said layer.

3. A spool in accordance with claim 2 wherein said barrel is formed of foam glass and said flanges are formed of expanded polystyrene, and a layer of resilient bonding material disposed between the ends of said barrel and the corresponding surfaces of said flanges.

* * * * *